United States Patent
Horn et al.

(10) Patent No.: US 8,924,568 B2
(45) Date of Patent: Dec. 30, 2014

(54) METHODS AND SYSTEMS FOR MANAGING CONTENTION AMONG NODES IN WIRELESS COMMUNICATION SYSTEMS

(75) Inventors: Gavin Horn, La Jolla, CA (US); Ashwin Sampath, Princeton, NJ (US); Sanjiv Nanda, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 582 days.

(21) Appl. No.: 12/365,249

(22) Filed: Feb. 4, 2009

(65) Prior Publication Data

US 2010/0198953 A1    Aug. 5, 2010

(51) Int. Cl.
*G06F 15/16*   (2006.01)
*H04W 72/00*   (2009.01)
*H04W 72/04*   (2009.01)

(52) U.S. Cl.
CPC ............................... *H04W 72/0406* (2013.01)
USPC ........... 709/227; 709/225; 370/328; 370/329; 455/450

(58) Field of Classification Search
USPC ............ 709/227, 223; 370/328, 329; 455/450
See application file for complete search history.

(56) References Cited

U.S. PATENT DOCUMENTS

| | | | |
|---|---|---|---|
| 7,961,698 B2 | 6/2011 | Wu et al. | |
| 2002/0015393 A1 | 2/2002 | Pan et al. | |
| 2002/0150074 A1 | 10/2002 | Hayashi et al. | |
| 2002/0159511 A1* | 10/2002 | Wilson et al. | 375/222 |
| 2005/0003843 A1* | 1/2005 | Ho et al. | 455/509 |
| 2005/0117536 A1* | 6/2005 | Cho et al. | 370/328 |
| 2007/0004437 A1 | 1/2007 | Harada et al. | |
| 2009/0019173 A1 | 1/2009 | Wu et al. | |
| 2009/0111497 A1* | 4/2009 | Bitter et al. | 455/513 |
| 2009/0213786 A1 | 8/2009 | Tanno et al. | |

FOREIGN PATENT DOCUMENTS

| | | |
|---|---|---|
| CN | 1205604 A | 1/1999 |
| CN | 1444348 A | 9/2003 |
| CN | 1531790 A | 9/2004 |
| CN | 1734983 A | 2/2006 |
| EP | 0720321 | 7/1996 |

(Continued)

OTHER PUBLICATIONS

Crow B P et al: "IEEE 802.11 Wireless Local Area Networks" IEEE Communications Magazine, IEEE Service Center, Piscataway, US LNKD-001:10.1109/35.620533, vol. 35, No. 9, Sep. 1, 1997, pp. 116-126, XP000704431 ISSN: 0163-6804 p. 119, col. 2, lines 48-60 figure 6.

(Continued)

*Primary Examiner* — Viet Vu
*Assistant Examiner* — Herman Belcher
(74) *Attorney, Agent, or Firm* — James K. O'Hare (57) ABSTRACT

A method of managing contention in a wireless network is described. The wireless network may include an access router and a plurality of access terminals connectable to the base station. The method may include designating a data slot as a downlink slot or an uplink slot, and sending a signal from the access router to the access terminals to indicate the designation of the data slot. The access router may determine whether the data slot should be designated as a downlink slot or an uplink slot by assessing information such QoS (quality of service) requirements contained in a REQ message received from one or more of the access terminals, and information regarding buffer level received from one or more of the access terminals.

29 Claims, 6 Drawing Sheets

(56) References Cited

FOREIGN PATENT DOCUMENTS

| EP | 0841763 | 5/1998 |
|---|---|---|
| EP | 1626608 | 2/2006 |
| EP | 1720368 | 11/2006 |
| JP | 2001251240 A | 9/2001 |
| JP | 2001298762 A | 10/2001 |
| JP | 2006295725 A | 10/2006 |
| KR | 20050038977 A | 4/2005 |
| WO | 2009009691 | 1/2009 |

OTHER PUBLICATIONS

International Search Report—PCT/US2010/023160—International Search Authority, European Patent Office, Jun. 9, 2010.
Asa, M., et al., "Relay Strategy of Broadcast Messages in Mobile Multihop Relay", IEEE C802.16mmr-06/008, WirelessMAN, Jan. 6, 2006.
Taiwan Search Report—TW099103390—TIPO—Jan. 2, 2013.
Written Opinion—PCT/US2010/023160—ISA/EPO—Sep. 6, 2010.

* cited by examiner

METHODS AND SYSTEMS FOR MANAGING CONTENTION AMONG NODES IN WIRELESS COMMUNICATION SYSTEMS

BACKGROUND

1. Field

The present disclosure relates generally to communications, and more specifically to methods and systems for signaling in wireless communication systems.

2. Background

Wireless telecommunication systems are widely deployed to provide various services, including but not limited to telephony, data, video, audio, messaging, and broadcasts. These systems may be multiple-access systems capable of supporting multiple users by sharing the available system resources. Examples of such multiple-access systems include, but are not limited to, CDMA (Code Division Multiple Access) systems, TDMA (Time Division Multiple Access) systems, FDMA (Frequency Division Multiple Access) systems, and OFDMA (Orthogonal Frequency Division Multiple Access) systems.

One type of wireless communication system is a P2P (peer-to-peer) networks, in which each node or workstation has equivalent capabilities and responsibilities. This differs from client/server architectures, in which some computers are dedicated to serving the others. Instead clients or servers, P2P networks have equal peer nodes that simultaneously function as both "clients" and "servers" to the other nodes on the network. In the context of a wireless communication system, this may be viewed as a system where a base station (defined below) or an access point (defined below) is not required for two devices to communicate with each other. They can communicate either directly with each other or through other devices. In one embodiment of the present disclosure, a common air interface design that can be used both in the "infrastructure" mode and the "peer-to-peer" mode is used as the context. As further explained below, an infrastructure mode includes an access router and access terminal architecture. As also further explained below, a peer-to-peer mode is also referred to as an adhoc mode.

In wireless communication systems, a base station or access router may transmit data to one or more terminals on the forward link and/or receive data from one or more terminals on the reverse link, at any given moment. The base station or access router may send signaling to indicate which terminals are scheduled for data transmission and to convey information pertinent to the reception of the data transmission.

There is a need for techniques to efficiently and reliably send and schedule messages in a wireless communication systems, including but not limited to P2P networks.

SUMMARY

A method for scheduling data transmission in a wireless network is disclosed. The wireless network may include an access router and a plurality of access terminals connectable to the base station. The method may include determining a number of the access terminals that are connected to the base station, and comparing the number with a threshold. The method may further include determining whether to use dedicated control signaling or shared control signaling from the base station, based on the comparison between the number of connected access terminals and the threshold.

A method of managing contention in a wireless network may include designating a data slot as a downlink slot or an uplink slot, and sending a signal from the access router to the access terminals to indicate the designation of the data slot. The access router may determine whether the data slot should be designated as a downlink slot or an uplink slot by assessing information such as QoS (quality of service) requirements contained in a REQ (request-to-transmit) message received from one or more of the access terminals, and information regarding buffer level received from one or more of the access terminals.

A method of scheduling among a plurality of nodes may include performing a first sequence of steps followed by a second sequence of steps, each sequence including a Tx (transmit) step followed by a Rx (receive) step. During the Tx step, one or more of the nodes send a REQ signal containing a request to transmit. During the Rx step, another one or more of the nodes receive the request signal, and respond by sending a confirmation signal indicating an accept or a decline of the REQ signal. The REQ signal may include a unicast portion and a broadcast portion. In an uplink mode of the slot, the nodes that respond during the Rx step may use the unicast portion of the REQ signal to send supplemental information, in addition to the indication of the acceptance or declination of the REQ signal. The supplemental information may include information regarding bandwidth assignment made by the access router for the nodes that are scheduled to transmit data.

It is understood that other embodiments of the present disclosure will become readily apparent to those skilled in the art from the following detailed description, wherein various embodiments of the disclosure are shown and described by way of illustration. As will be realized, the disclosure is capable of other and different embodiments and its several details are capable of modification in various other respects, all without departing from the spirit and scope of the present disclosure. Accordingly, the drawings and detailed description are to be regarded as illustrative in nature and not as restrictive.

BRIEF DESCRIPTION OF THE DRAWINGS

The drawing figures depict one or more implementations in accordance with the present concepts, by way of example only, not by way of limitations. The drawings disclose illustrative embodiments. They do not set forth all embodiments. Other embodiments may be used in addition or instead. In the figures, like reference numerals refer to the same or similar elements.

DETAILED DESCRIPTION

In the present disclosure, methods and systems are disclosed for signaling and scheduling messages in wireless communication systems. In general, scheduling of users results in a more flexible use of the system resources, e.g., power and bandwidth, compared to a situation in which a fixed amount of resources are constantly allocated to the users.

Wireless communication networks include unplanned user deployable networks, and peer-to-peer networks. Wireless communication networks may operate in an ad-hoc mode of communication, or an infrastructure mode of communication. In an ad-hoc mode of communication, any node may communicate with any other node, with no fixed master-slave relationship defined. In certain cases, the MAC (medium access control) may assign a temporary master & slave node for each transmit opportunity or connection.

In an infrastructure mode, the notion of access routers and access terminals may be introduced. An access terminal has to connect to an access router, in order to send and/or receive data from the Internet. In an infrastructure mode, multiple access terminals can talk to the same access router.

In the present disclosure, the terms "access point," "base station," and "access router" all have the same meaning, and these terms are used interchangeably. In the present disclosure, the term "access terminal" has the same meaning as the term "mobile station," and these terms are used interchangeably.

An access terminal is a node that can function in both ad-hoc and infrastructure modes. An access terminal acts as a data source or sink, with no forwarding. Examples of access terminals include, but are not limited to: a cellular phone, a PDA (personal digital assistant), a wireless device, a handheld device, a wireless modem, and a laptop computer.

An access router provides access to other nodes, to the rest of the network, via a wired or wireless backhaul connection. The access router does not act as a data source or sink. An access router can page, or receive an access terminal-initiated access. Each access router, or access point, provides communication coverage for a particular geographic area and supports communication for the access terminals located within the coverage area. The access routers may couple to a system controller that provides coordination and control for these access routers.

In the present disclosure, the term "forward link" has the same meaning as the term "downlink," and these terms are used interchangeably. In the present disclosure, the term "reverse link" has the same meaning as the term "uplink," and these terms are used interchangeably.

An access terminal may receive data transmission on the forward link from one access router at any given moment and may send data transmission on the reverse link to one or more access routers. In the present disclosure, the term forward link, also referred to as downlink, refers to the communication link from the access routers to the access terminals. In the present disclosure, the term RL (reverse link), also referred to as UL (uplink), refers to the communication link from the access terminals to the access routers. In a UL mode, access terminals talk to the access router. In a DL mode, the access router talks to the access terminals.

Figure 1:
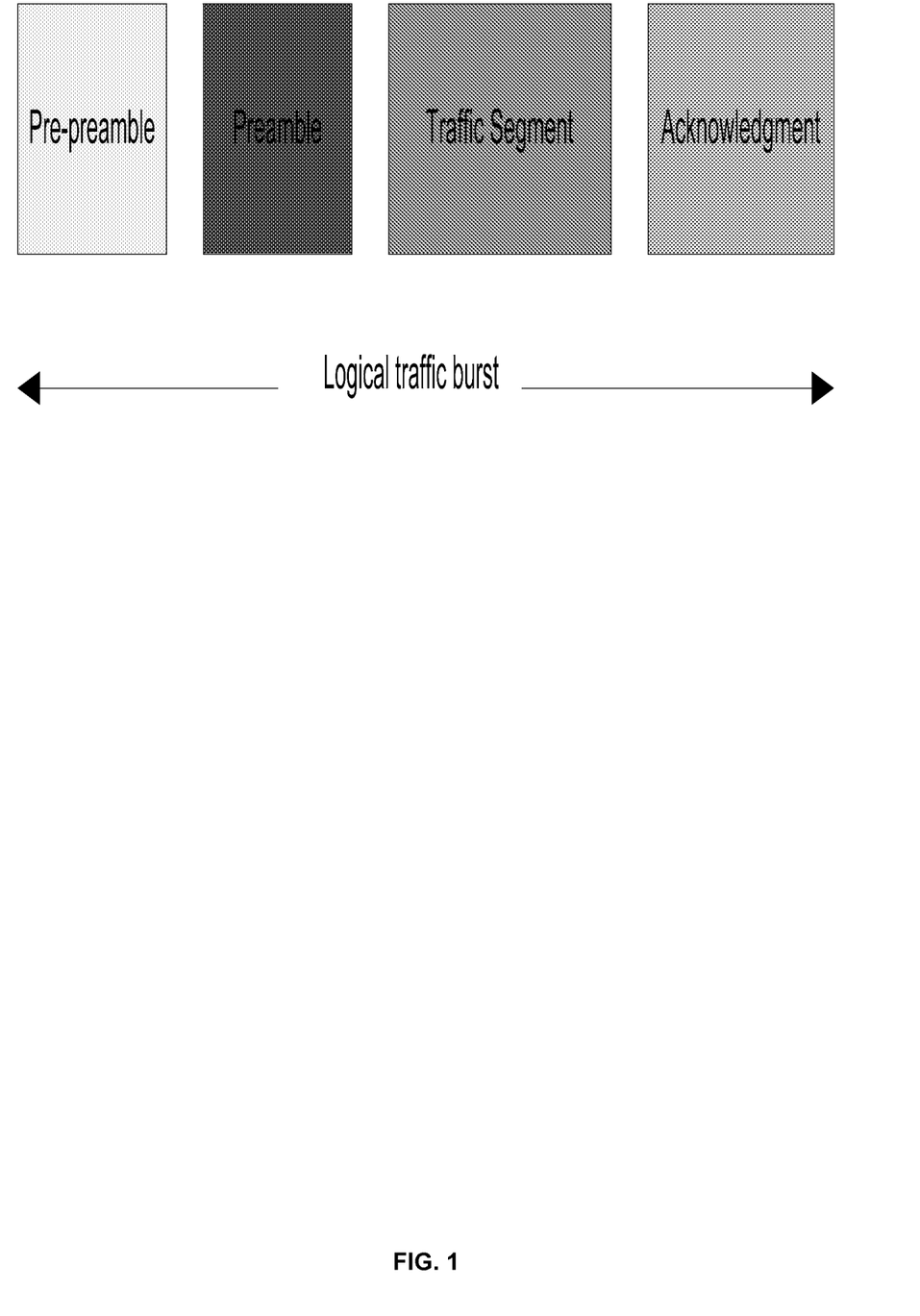
FIG. 1 is a conceptual block diagram illustrating a logical traffic slot in a wireless network, in one embodiment of the present disclosure.

FIG. 1 is a conceptual block diagram illustrating a logical traffic slot in a wireless communication system, in one embodiment of the present disclosure. The traffic slot comprises 4 stages: 1) a PPA stage for scheduling nodes, consisting of a series of Request to transmit, Tx to Rx, and RUM (Resource Utilization Message or Rx echo), Rx to Tx, steps; 2) PA (preamble) for rate prediction consisting of a Pilot (Tx to Rx) step and a Grant (Rx to Tx) step; 3) a traffic segment or data portion; and 4) an acknowledgment section. In the present application, the term Resource Utilization Message (or Rx echo) is used to represent a broadcast message sent by a receiver in the Rx step to enable proper yielding (e.g. power control, avoidance of certain time/frequency resources etc.) by potential interfering transmitters (from the Tx step) in the area. Further descriptions of the term Resource Utilization Message may be found e.g. in published application Nos. 20070115817, 20070105576, and 20070105573, the contents of which are incorporated herein by reference in their entireties.

The system supports both ad-hoc and infrastructure modes with the same control and data structure. The control resource is not partitioned, either statically or dynamically, between adhoc and infrastructure uses. There is no pre-assigned node to transmit in each traffic segment. For example, in a given slot, a first ad-hoc node can send a request to a second ad-hoc node, and the second ad-hoc node can send a request to the first ad-hoc node. Similarly in a given slot, an access router can send request to multiple access terminals, and multiple access terminals can send requests to the access router.

Figure 2:
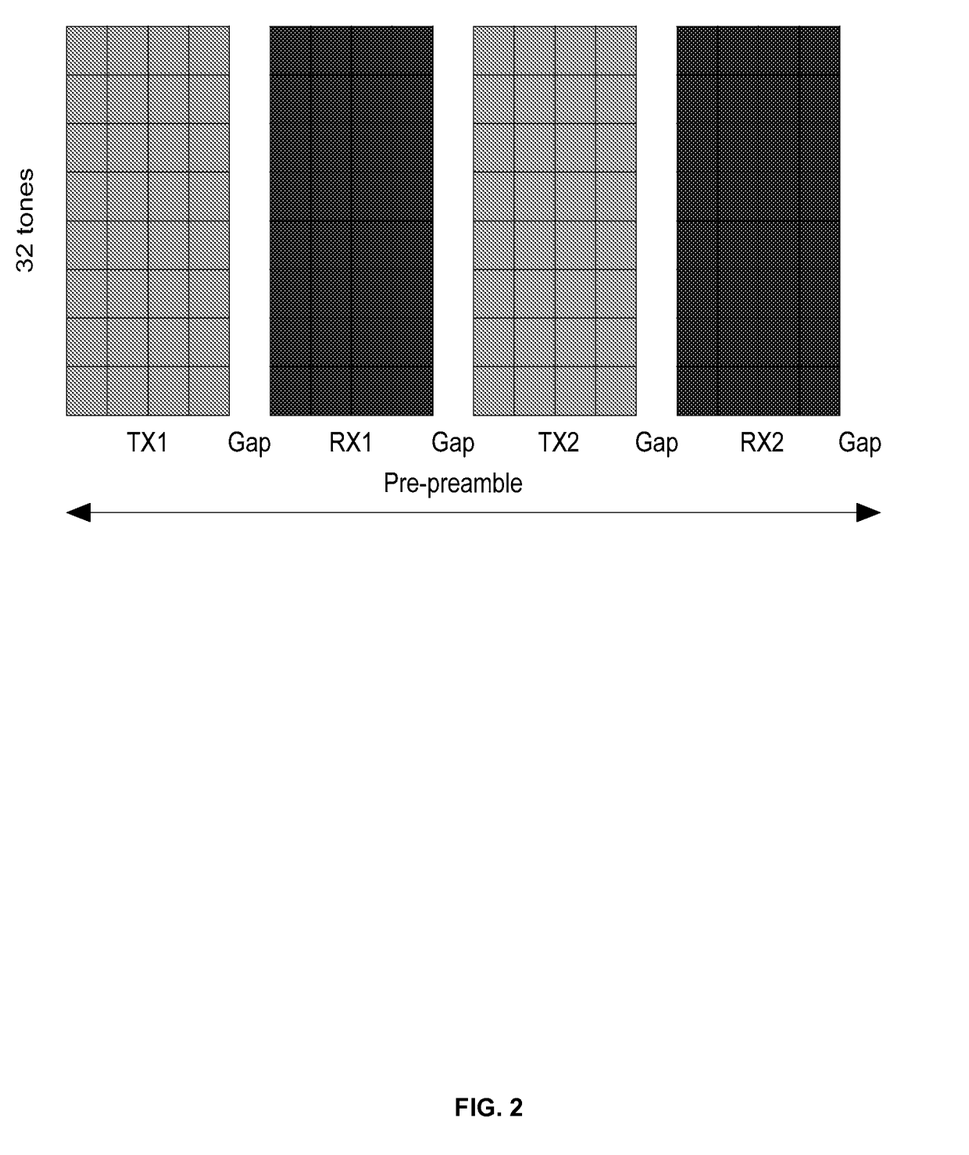
FIG. 2 is a conceptual block diagram illustrating a two-stage PPA (pre-preamble) design, in one embodiment of the present disclosure.

FIG. 2 is a conceptual block diagram illustrating a two-stage PPA design, in one embodiment of the present disclosure.

In the illustrated embodiment, the PPA uses alternating Tx and Rx steps to schedule transmissions. For example, there are 2 Tx steps and 2 Rx steps in the illustrated PPA design. Other embodiments may use different designs for the PPA.

In general, the Tx step is used by the nodes to indicate a desire to transmit. For ad-hoc and infrastructure mode access terminals, the Tx step is used to send a REQ that may include a QoS and buffer level information. For infrastructure mode access routers, the Tx includes access terminal selection on the downlink. QoS refers to the ability to provide different priority to different users, and/or to try to guarantee a given level of performance to the data flow.

In general, the Rx step is used by the receiving nodes to explicitly confirm a REQ and potentially block an interfering node from transmitting in the data portion. In the infrastructure mode, the Rx step is also used by the access routers to perform access terminal selection on the uplink. The RUM or Rx echo is always sent in the Rx step, if the receiver intends to receive from the transmitter in the slot being contended for.

In an ad-hoc mode, the two stage PPA allows each node to send a request in one of the two Tx steps, i.e., a pair of communicating nodes may not request to transmit to one another in the same Tx step. In an infrastructure mode, all access terminals transmit in one Tx step and the access router transmits in another Tx step. A node transmitting in a Tx step is assumed to be deaf in that step, i.e. it is assumed it does not listen to any symbol even if it is not transmitting in that symbol. This assumption is to account for turnaround times between transmit and receive that is needed, for example, by the radio-frequency front-end.

The PPA may be used to resolve contention for a data slot. Use of the PPA to resolve contention for a data slot may include, but is not limited to: managing intra-pair contention; managing inter-pair contention among non-communicating nodes; and managing interference and identifying which simultaneous transmissions should take place in the data slot In addition, the PPA may also be used to resolve a data slot as being uplink or downlink. In other words, the PPA may be used to receive uplink requests from access terminals and indicate user selection from access routers, and/or indicate a scheduling by the access routers and/or a confirmation by the scheduled access terminals.

It is desirable that the contention resolution resulting from the PPA transmissions appropriately manage reuse versus orthogonalization. In other words, the contention resolution should make the decision as to whether the links should operate simultaneously and take the hit of the lower instantaneous data rate that they get, or whether they should choose to partition themselves either in time or frequency, i.e. undergo orthogonalization. Also, the contention resolution should manage fairness in interference avoidance, and provide capability to manage QoS in contention resolution for both intra- and inter-pair cases.

Some of the information in the PPA may be unicast information, and some may be broadcast information. When information is unicast, the information is sent to a single destination, i.e. to a single intended receiver. When information is broadcast, the sender wants every receiver that can hear the information hear it. The sender therefore announces, to all the receivers in its vicinity, its intention to transmit, so that all the receivers in the vicinity can properly account for the fact that the sender is going to interfere with them.

If unicast information and broadcast information are separated in the signal design, a pilot may be used for the broadcast part and channel estimation for the unicast part. Additionally, the unicast portion may be power controlled to just reach the target receiver, thereby softening collisions on the common resource in the Tx and Rx steps.

In the Tx step, unicast information has to tell the intended receiver that the transmitter has data to send, and tell the transmitter's QoS requirements. Broadcast information has to let all the receivers in the vicinity of the transmitter know that the transmitter is likely to transmit In the Rx step, unicast information has to tell the transmitter (that sent the request to transmit) that the intended receiver will receive, and also to tell the transmitter to send a pilot in the preamble. Broadcast information has to send RUMs for Tx yielding.

In one embodiment, the PPA provides 3 types of yielding for interference management: Tx yielding, Rx yielding, and QoS yielding.

Tx yielding takes place in the Tx2 (second Tx) step, or with no pilot in preamble. Tx yielding is the method used by nodes to decide whether or not to send a REQ. If a node hears a RUM in an earlier Rx step that has higher priority than its REQ, then the node does not send the REQ.

Rx yielding takes place in the Rx1 (first Rx) and Rx2 (second Rx) steps. The receiving node does not send a RUM in response to a REQ in one of the Tx steps QoS yielding takes place in the Tx2 step, only. QoS yielding is used by the node in the Tx2 step to override a REQ sent by its communicating node in the Tx1 (first Tx) step. In the infrastructure mode, an access terminal cannot override an access router. This is a policy decision, as opposed to the access router being prevented by the MAC itself.

In one embodiment, two steps are taken in the infrastructure mode in order to schedule nodes on the downlink and uplink: user selection, and bandwidth assignment.

User selection is always performed in the PPA. In one embodiment, an access router schedules a superset of access terminals to transmit to or receive from. Among the access terminals in the superset, some will be blocked due to other nearby transmissions, and the remainder will get scheduled.

On the downlink, an access router sends a REQ in the Tx step to the superset of access terminals that may be scheduled. Some access terminals may be blocked by other REQs (Rx yield) but the rest of the access terminals will receive data.

On the uplink, an access router sends a RUM in the Rx step to the superset of access terminals that may be scheduled. Some access terminals may be blocked by other RUMs (Tx yield), but the rest of the access terminals will transmit data.

Regarding BW (bandwidth) assignment, there may be a tradeoff on both downlink and uplink as to when to do BW assignment. If BW assignment is performed in the PPA, there is a potential wastage if access terminals are blocked or yield, or if the bandwidth estimate in the PPA was too conservative. If the bandwidth assignment estimate was too conservative, the estimate may have reserved more bandwidth for an access terminal than it needed for its traffic, but may have allowed for more accurate rate prediction if the PA allows rate predication per channel.

If bandwidth assignment is not done at the PPA stage, then on the uplink bandwidth assignment needs to be signaled in the PA. In this case, extra overhead is introduced at the PA. For the downlink, bandwidth assignment can be included with the data slot or in the PA. If included in the data slot, then the bandwidth assignment may restrict the PA and/or the data slot PHY (physical layer) design.

User Selection By Access Router—Signaling Control Messages to an Access Router

In general, an access router has to signal the schedule for transmissions among its connected access terminals. In traditional cellular systems, on the downlink, an access router has used a common resource to indicate which access terminals are scheduled. Each access terminal is required to decode this resource in order to determine whether it has been scheduled. On the uplink, each access terminal is given dedicated resources for signaling.

In one embodiment of the present disclosure, methods and systems are described for scheduling using a hybrid of dedicated and shared signaling resources as a function of the number of attached access terminals. For the downlink in the infrastructure mode, dedicated signaling may be expensive when the targeted number of users supported is high because mostly only a small fraction of them would be selected. This, for example, may be the case in most cellular systems. In such instances shared signaling may be beneficial. On the other hand, when there are few users in the system, dedicated downlink signaling may be helpful because identification of the users, via their MAC ID (medium access control identifier) or equivalent, is expensive and may be skipped.

Several options are described in this disclosure. A first option is to use dedicated resources in the Tx step of the PPA. A second option is to use shared resources in the Tx step of the PPA. A third option is to use dedicated resources with TDM (time division multiplexing), meaning that the dedicated resource is not necessarily available for use in every time slot, but with a certain periodicity. A fourth option is to use a hybrid of dedicated and shared signaling resources.

In the first option, where dedicated resources are used in the Tx step of the PPA, the access terminals connected to an access router each have a dedicated orthogonal tone set on downlink. An access terminal is scheduled if the access terminal sees a signal on its tone set. QoS broadcast bits are sent on the dedicated orthogonal tones, for other nodes to do Rx yielding. In this option, the resources needed scale with the number of access terminals connected to an access router. Also, the downlink of the infrastructure mode appears as multiple ad-hoc nodes to other nodes. Since the uplink is always dedicated, the uplink and downlink consume the same number of tone sets in the PPA.

In the second option, where shared resources are used in the Tx step of the PPA, the access router has a set of common orthogonal tone sets to signal on downlink. An access terminal is scheduled if the access terminal decodes the common tone sets and sees its MAC ID. QoS broadcast bits are sent on the common orthogonal tones for other nodes to do Rx yielding. This option allows an access router to schedule among more access terminals, for the same PPA resources. This option also limits the amount of PPA resources that can be used by an access router on the downlink, without limiting the set of access terminals that can be scheduled. Finally, extra unicast information is required to be sent in the PPA, namely the MAC ID of the scheduled access terminals.

In the third option, where dedicated resources are used with TDM (time division multiplexing), an access router can TDM among the access terminals on the same tone sets, in order to accommodate more access terminals. This option limits the resources used in the PPA by each access router, but there is a latency and efficiency penalty if every access terminal is not allowed to transmit or receive in every slot.

In the fourth option, where a hybrid of dedicated and shared resources may be used, a choice between shared versus dedicated resources may be made, as a function of the number of attached access terminals. Specifically, if the number of attached access terminals is above a threshold, shared resources are used, otherwise dedicated resources are used. In this option, dedicated signaling is better at low loading, and shared signaling is better at high loading.

Figure 3:
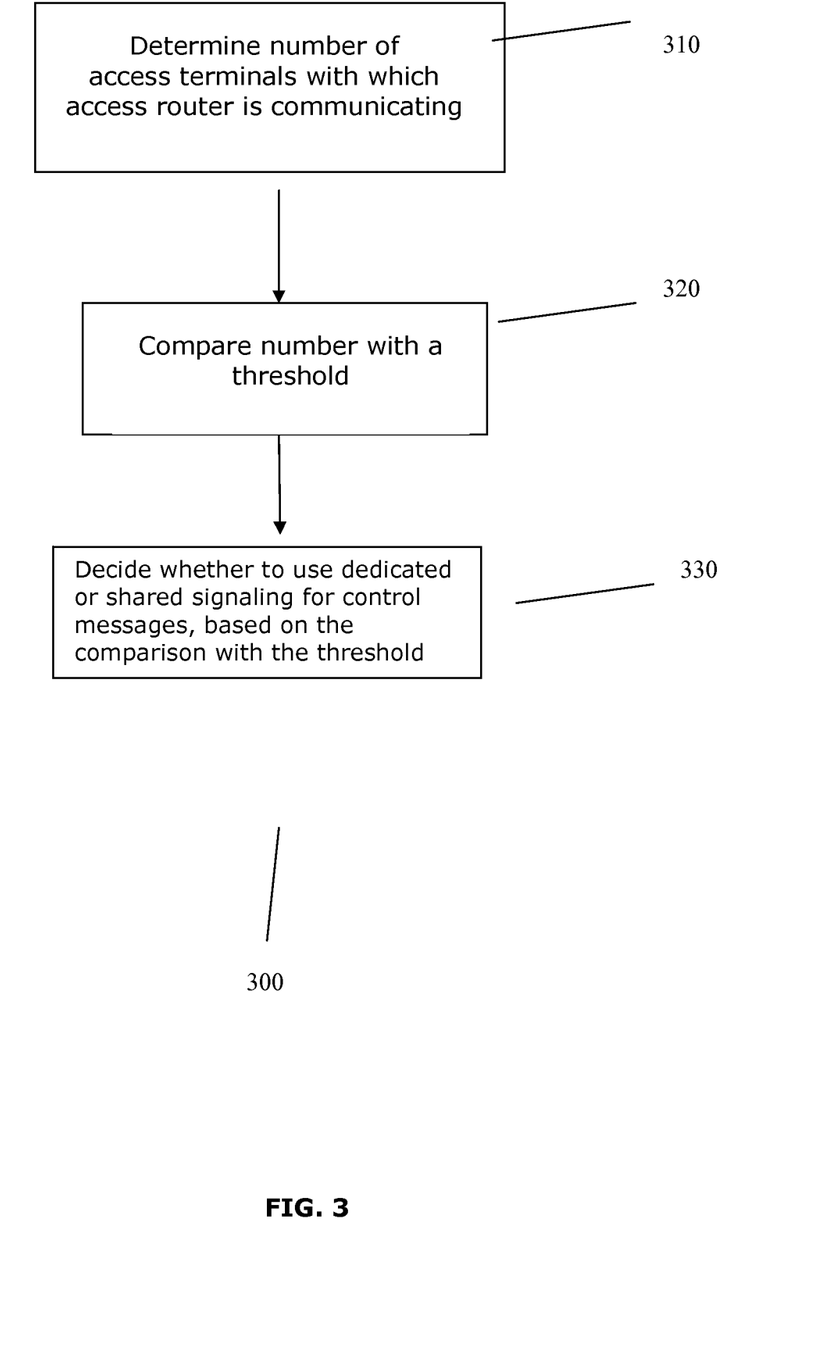
FIG. 3 is a schematic flowchart illustrating an example of a method for user selection in a wireless network, in one embodiment of the present disclosure.

FIG. 3 is a schematic flowchart illustrating an example of a method 300 for user selection in a wireless network, in one embodiment of the present disclosure. In the illustrated embodiment, the method 300 of an access router signaling control messages to access terminals may include an act 310 of determining the number of access terminals which the access router is currently communicating with. The method 300 may further include an act 320 of comparing the number to a threshold. The method 300 may further include an act 330 of deciding whether to use dedicated or shared signaling for the control messages, based on the comparison.

Dedicated control signaling may be used to indicate information regarding which ones of a plurality of access terminals are scheduled to transit or receive data in a slot.

When the number of access terminals connected to the access router is less than the threshold, dedicated control signaling from the access router to selected ones of the access terminals may be used. When the number is greater than or equal to the threshold, a shared control signal may be sent from the access router to all the access terminals. The shared control signal may contain information identifying which ones of the plurality of access terminals are being addressed.

Using the dedicated control signal may include selecting, from a set of dedicated orthogonal tones assigned to each of the access terminals, a subset of tones belonging only to those access terminals that are selected to transmit data during the slot, and sending the dedicated control signal on the selected subset of tones. The QoS broadcast bits may be sent on this subset of tones, so that the access terminals served by other access routers can determine whether or not they should Rx yield, based on these QoS broadcast bits.

The shared control signal may include a common set of physical resources that constitute a control channel, and an identifier for each of the access terminals that are selected to transmit or receive data or control information during the slot. The identifier may be a MAC ID.

The shared control signal may be sent on a set of common orthogonal tones shared by all the access terminals. The shared control signal may be encoded in a way that allows the common orthogonal tones to be decoded by the access terminals, and the identifier to be recognized by its corresponding access terminal.

A system for scheduling data transmission in a wireless network that includes an access router and a plurality of access terminals connectable to the access router may include a processing system that is configured to determine a number of the access terminals that are connected to the base station, and compare the number with a threshold. The processing system may be further configured to determine, based on the comparison between the number of connected access terminals and the threshold, determine whether to use dedicated control signaling or shared control signaling from the base station.

A computer-readable medium having stored therein computer-readable instructions for a processor. These instructions, when executed by the processor, may cause the processor to determine, for a plurality of access terminals, the number of the access terminals that are connected to a base station, in a wireless network, and compare the number with a threshold. These instructions may further cause the processor to determine, based on the comparison between the number of connected access terminals and the threshold, whether to use dedicated control signaling or shared control signaling from the base station.

Managing Contention to Designate a Slot as Downlink or Uplink

In another embodiment of the present disclosure, methods and systems are disclosed for managing contention among nodes for a data slot. Contention may be managed so that the direction of transmission, i.e. the direction of the directed link, between when an access router should transmit and when at least one of a plurality of access terminals should transmit, may be determined. The direction may be determined by designating the slot as downlink or uplink. In other words, the access router may determine whether the slot is to be used to transmit or receive in. The access router may send a signal, for example a MAP signal, to indicate whether the slot is to be used to transmit or receive. The access router may send a REQ to transmit or listen for REQs from its access terminals based on the signal that is sent. Each access router may make this determination independently of the determination made by other access routers, and may dynamically vary its decision.

In the infrastructure mode, the resources consumed tend to scale with the number of access terminals communicating with the access router. In the current PPA design, either the access terminals or the access router request in the first Tx step. Since the access router is aware of all the connected access terminals' QoS service requirements as well as their current buffer levels, it is desirable for the access router to be able to control on a slot-by-slot basis whether a slot is being used for uplink or downlink communications, i.e., manage the contention for the PPA among its access terminals.

One method to control this is for the access router to always use the first Tx step. In this scenario, the access router can always decide whether to designate a slot as downlink and send a REQ to its access terminals, or to defer and allow the access terminals to REQ in the second Tx step. The problem with this approach is that when there are many access routers in a region, they will always send REQs on the same Tx step. If a pair of access routers happen to be jammers for one another, there is no way for them to orthogonalize across Tx steps in the PPA.

In one embodiment of the present disclosure, a method is described for signaling at the access router, in which the access router uses a MAP signal to designate the next logical slot as downlink or uplink. The signaling is sent at some stage before the PPA. The MAP signal allows the access router downlink assignment location to hop between Tx steps and hence reduces the probability of colliding with a jammer, and also reduces the load and interference seen by other nodes in the PPA since only the access router or the access terminals will send REQs in a given PPA slot.

In some embodiments, contention may be managed to designate a slot to the uplink or downlink, by the access router.

Figure 4:
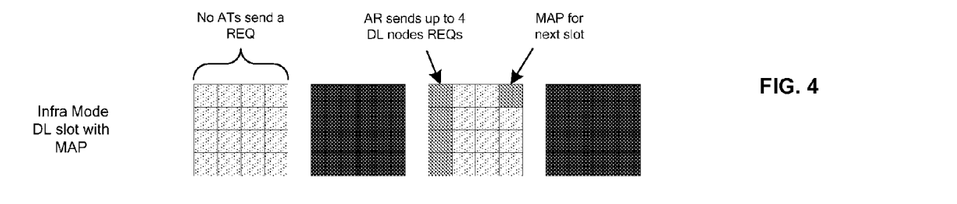
FIG. 4 is a conceptual block diagram illustrating the designation of a slot as a downlink slot, in one embodiment of the present disclosure.

FIG. 4 is a conceptual block diagram illustrating the designation of a slot as a downlink slot, in one embodiment of the present disclosure. In FIG. 4, the downlink slot in the infrastructure mode shows only an access router sending a REQ. In the downlink slot shown in FIG. 4, no access terminals send a REQ during the Tx1 step, while the access router sends the REQ in the Tx2 step. In the Tx2 step, the access router sends up to four downlink nodes REQs. The access router also sends what it plans to do for the next slot, i.e. sends a MAP signal. The MAP for the next slot is shown in FIG. 4 as signaled in the Tx2 stop of the PPA.

Figure 5:
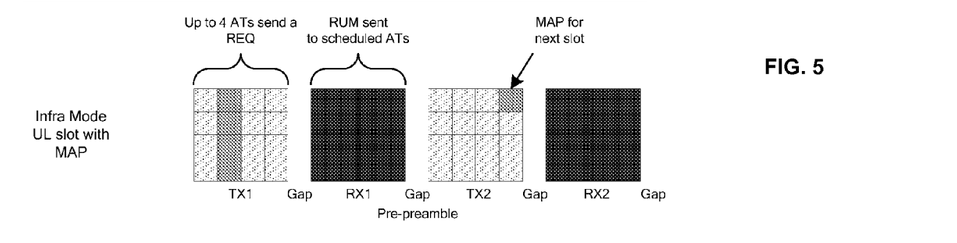
FIG. 5 is a conceptual block diagram illustrating the designation of a slot as an uplink slot, in one embodiment of the present disclosure.

FIG. 5 is a conceptual block diagram illustrating the designation of a slot as an uplink slot, in one embodiment of the present disclosure. In the uplink slot in the infrastructure mode, shown in FIG. 5, up to 4 access terminals send a REQ during the Tx1 step. In the Rx1 portion, a RUM is sent by the access router to scheduled access terminals.

In FIGS. 4 and 5, two examples have been illustrated regarding the use of a MAP signal to designate a slot as downlink and uplink. In FIG. 4, the downlink slot shows that only an access router sends a REQ, while in FIG. 5, the uplink slot shows that only the access terminals send a REQ.

The methods and systems described above thus allow the access router and the access terminal to use either Tx1 or Tx2, while at the same time unambiguously determining the direction of the next slot.

A method for signaling in a wireless network having a plurality of nodes, to indicate the designation of a data slot, may include designating a data slot as a downlink slot or an uplink slot, and sending a signal from the access router to the access terminals to indicate the designation of the data slot. The signal from the access router to the access terminals may be sent during a data slot that precedes the data slot designated as downlink or uplink.

A REQ message may be sent from the access router to the access terminals if the data slot is designated as a downlink slot, and receiving at the access router one or more REQs from more than one access terminals if the data slot is designated as an uplink slot.

The access router may determine whether the data slot should be designated as a downlink slot or an uplink slot by assessing features that may include, but are not limited to: information regarding QoS requirement contained in a REQ message received from one or more of the access terminals; information regarding buffer level received from one or more of the access terminals; the radio frequency conditions in the wireless network; the recent data transmission rate in the wireless network; and the recent proportion of uplink to downlink slots.

The access router may determine when and where to send the signal by assessing whether it received data or transmitted data during a data slot that immediately precedes the data slot that has been designated as a downlink slot or an uplink slot.

The access router may determine the slot designation based on the presence or absence of REQs for that slot from at least one access terminal. RF conditions may be used to determine if the access router can receive data from one or more access terminals with adequate reliability.

In one embodiment, slot designation may be determined to be downlink based on determining that the access router cannot receive reliably due to high interference.

The signal from the access router to the access terminals may be an explicit slot designation signal, for example an MAP signal.

In one embodiment, the slot designation may be conveyed implicitly by the access router by sending a REQ signal, instead of a response to requests from at least one access terminal.

A system for managing contention in a wireless network may include a processing system configured to designate a data slot as either a downlink slot or an uplink slot, and to send a signal from the access router to the access terminals to indicate the designation of the data slot. The processing system may be further configured to send a request-to-transmit REQ message from the access router to the access terminals if the data slot is designated as a downlink slot, and to receive at the access router one or more REQs from more than one access terminals if the data slot is designated as an uplink slot.

A computer-readable medium may have stored therein computer-readable instructions for a processor. The instructions, when executed by the processor, may cause the processor to designate a data slot as a downlink slot or an uplink slot, and to send a signal from an access router to one or more access terminals connected to the access router in a wireless network, to indicate the designation of the data slot.

Scheduling Among Nodes for a Data Slot by Signaling in the Unicast Portion of the Tx Step In one embodiment of the present disclosure, a method of scheduling among nodes for a data slot on the uplink may include a contention phase in which a plurality of alternating steps are used during which transmitters send Request indications to request to transmit, and receivers respond with Grant indications to indicate the request has been accepted. The request indication may include unicast and broadcast information. A transmitter may use the unicast portion of the request indication to signal additional information to the receiver.

Table 1 below shows the information sent in the PPA Tx and Rx steps assuming normal operation for both the ad-hoc and infrastructure modes. Text that is not underlined indicates information that may be inferred by position and/or presence of signal energy but also explicitly sent. Text that is underlined indicates information that is more likely to be sent explicitly.

TABLE 1

Information sent in PPA Tx and Rx steps

|    | Ad-hoc and Uplink Infrastructure Unicast | Downlink Infrastructure Unicast | Broadcast |
| --- | --- | --- | --- |
| Tx | Desire to Tx<br>Buffer (optional)<br>Sender ID<br>Receiver ID | Desire to Tx<br>BW assignment<br>(optional in PPA)<br>Sender ID<br>Receiver ID | Interference Notification<br>(For Rx Yielding)<br>QoS Weight (optional)<br>Sender ID |
| Rx | Confirm a Tx<br>Sender ID<br>Receiver ID | Confirm a Tx<br>Sender ID<br>Receiver ID | Interference Notification<br>(For Tx Yielding)<br>QoS Weight (optional)<br>Sender ID |

The broadcast portion may include a QoS weight that is used to decide whether to yield to the REQ or GRANT. The QoS weight may not be used in which case the yield decision is done based on a priority derived from how the broadcast signal is sent, for example tone position in OFDMA. If the tone positions are permuted across PPA slots, round robin sharing can be achieved.

The unicast portion of the REQ includes a buffer size for access terminals and ad-hoc nodes and user scheduling information for access routers. The buffer size could be quantized to a small set of levels so that the number of bits needed to carry it in the REQ is not too large.

Table 1 shows that in the PPA, when a node wants to initiate communications, and wants to let the other receiver know that it wants to transmit, it has to let everyone in the neighborhood know that they have to watch out for interference. Col. 2 of Table 1 thus illustrates the case of ad-hoc and uplink infrastructure unicast.

In the case of uplink, unicast information means that one transmitter, which must be an access terminal, desires to send certain information to one access router. In the PPA, both types of information can be carried, namely unicast information (when only the intended receiver is desired to be called), and broadcast information (when every receiver that can hear is desired to be called).

In an uplink infrastructure mode of communication, the unicast information includes a buffer status, which indicates to the receiver how much data is available to be sent. The access router can thus determine how many resources to give an access terminal, based on which how much data the access terminal has in its buffer.

The broadcast information in an uplink infrastructure mode is shown in the last column of Table 1. This information is called Interference Notification. As one example, AT1 (first access terminal), AT2 (second access terminal) and AT3 (third access terminal) may be trying to communicate with AR1 (first access router), and then another AR2 (second access router) may be in the vicinity. AT1 may try to communicate with AR1, but then AT1 may not be able to send anything to AR1 because it is causing too much interference to AR2. In one embodiment, the broadcast portion of the Tx step of the PPA may include information that allows unintended receivers in the neighborhood to know about the transmission and some of its characteristics. Interference Notification logically represents such information. In the above example, it basically means that AT1 is trying to let AR2 know that it is likely to be transmitting, and what some of its characteristics are. QoS information is used to communicate to the unintended receiver how important it is for a node to make a communication. QoS is a weight on a scale of importance that allows an unintended receiver to make a decision whether to stop you from communicating or to allow you to communicate and tolerate the resultant interference. The QoS bits allow it to make that decision intelligently, taking into account the relative penalty for its link in yielding versus asking the other transmitter to yield.

Table 2 shows the modified information sent in the Tx and Rx steps of the PPA. As with Table 1, text that is not underlined indicates information that may be inferred by position and/or presence of signal energy but also explicitly sent. Text that is underlined indicates information that is more likely to be sent explicitly.

TABLE 2

Modified Information Sent In The Tx and Rx Steps

| | Ad-hoc and Access Terminal Infrastructure Unicast (1st Tx step) | Downlink Infrastructure Unicast (2nd Tx step) | Uplink Infrastructure Unicast (2nd Tx step) | Broadcast |
|---|---|---|---|---|
| Tx | Desire to Tx Buffer (optional) Sender ID Receiver ID | Desire to Tx Bandwidth assignment (optional in PPA) Sender ID Receiver ID | Desire to Rx Sender ID (identifier) Receiver ID | Interference Notification (For Rx Yielding) QoS Weight (optional) Sender ID |
| Rx | Confirm a Tx Sender ID Receiver ID | Confirm a Tx Sender ID Receiver ID | Nothing | Interference Notification (For Tx Yielding) QoS Weight (optional) Sender ID |

Rx yielding, shown in Table 2, means that an unintended receiver is trying to figure out whether it should be quiet and just bear the interference or whether it should try to stop the access terminal (that is causing the interference) from communicating. The unintended receiver is trying to decide whether it should tell the access terminal that it is causing too much interference, while the receiver has something really important to receive, and therefore that the access terminal must stop interfering.

In Rx1, the receiver confirms the transmission, i.e. confirms that it heard the message, and sends the transmitter and receiver IDs. In other words, the receiver tells the transmitter that the receiver acknowledges the transmitter's request to transmit, and that the receiver grants such a request.

The transmitter in the case of uplink transmission is the access terminal and in the case of downlink transmission, it is the access router.

Figure 6:
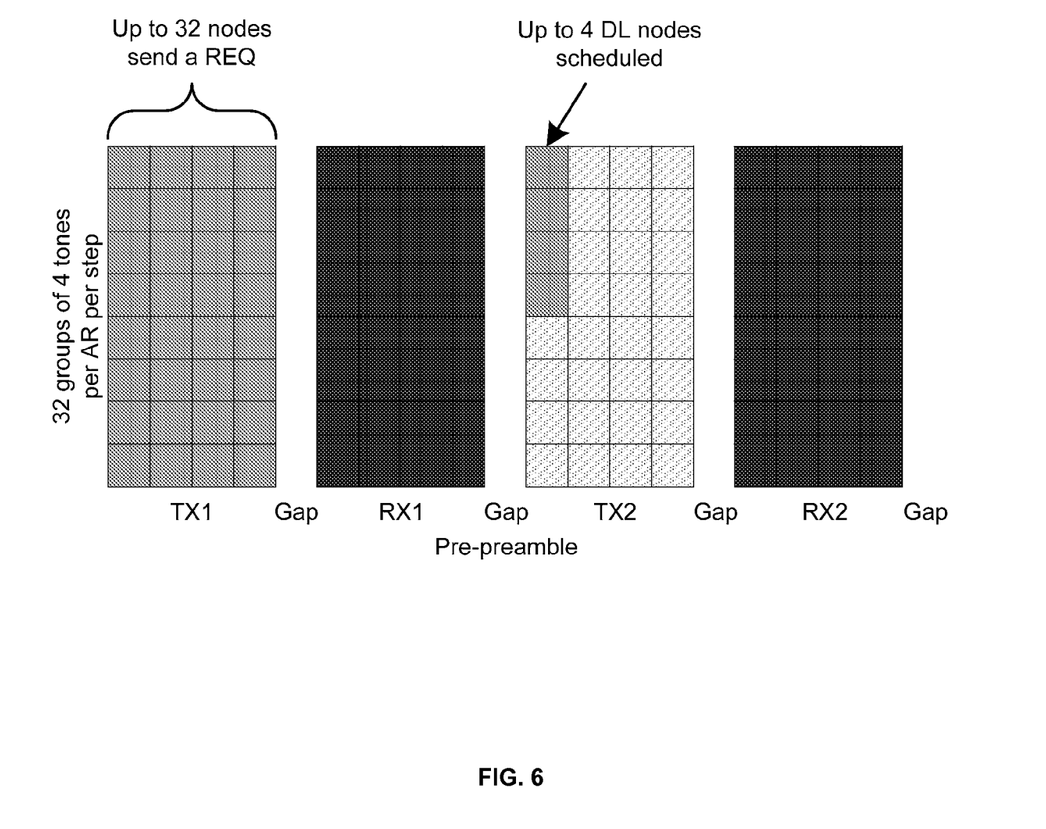
FIG. 6 is a conceptual block diagram illustrating the designation of the PPA as a downlink slot, in one embodiment of the present disclosure.
Figure 7:
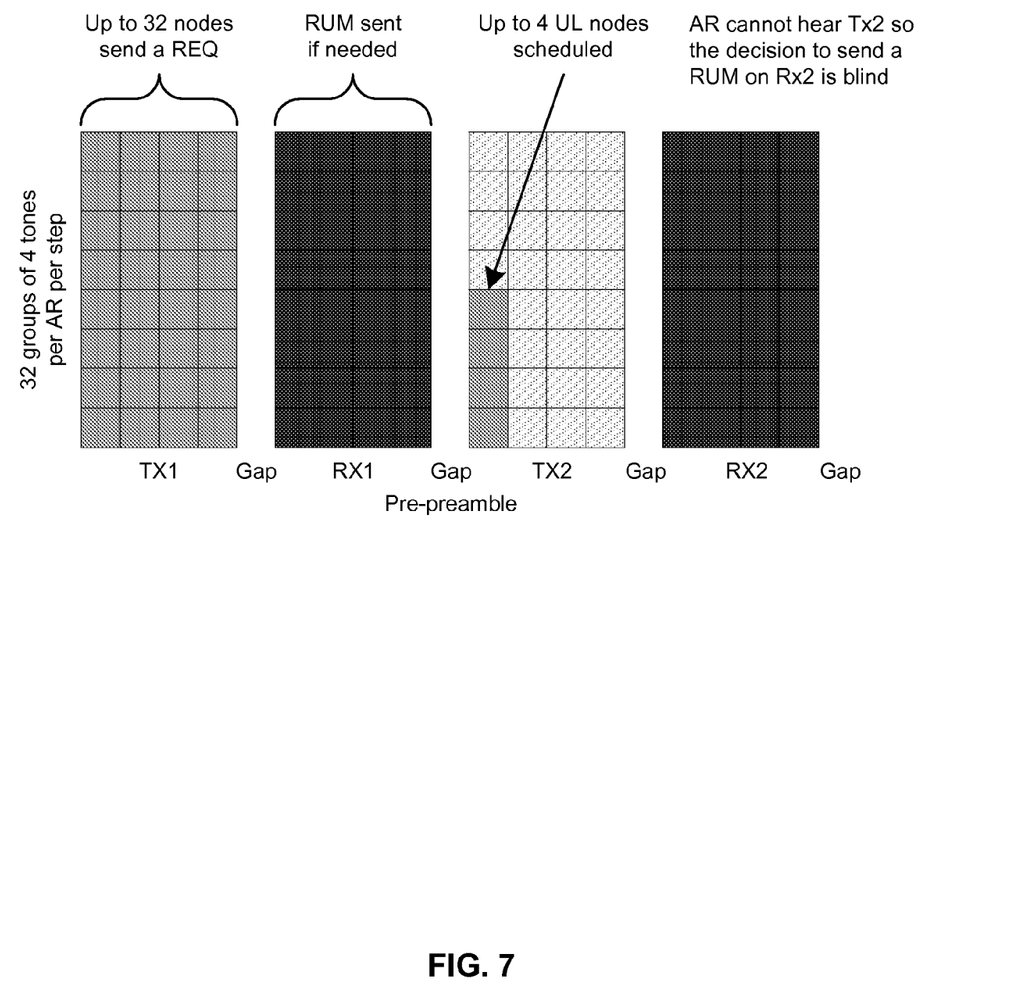
FIG. 7 is a conceptual block diagram illustrating the designation of the PPA as an uplink slot, in one embodiment of the present disclosure.

FIG. 6 is a conceptual block diagram illustrating the designation of the PPA as a downlink slot, in one embodiment of the present disclosure, while FIG. 7 is a conceptual block diagram illustrating the designation of the PPA as an uplink slot, in one embodiment of the present disclosure.

In an uplink in the infrastructure mode, a plurality of access terminals are trying to talk to an access router, while on the downlink there is a single access router trying to talk to a plurality of access terminals. Because of this asymmetry, the access router is the one that determines what resources should be used, both for uplink and downlink communications. The access router determines not only what resources (e.g. bandwidth and coding scheme) should be used, but also what kind of communications are allowed for the uplink and downlink communications.

There is an inherent asymmetry that while on the uplink, the receiver is the one that is deciding, on the downlink, the transmitter is the one that is deciding. Because in the uplink, the access router is the receiver so it is deciding, and in the downlink, the access router is the transmitter and it is deciding so only the access router will be the one that decides.

In the present disclosure, the problem of how to perform bandwidth assignment for the uplink is addressed. If the Rx step for infrastructure mode is only used by an access router to do user selection, then the bandwidth assignment has to occur in the PA stage.

As seen in FIGS. 6 and 7, in one embodiment the access routers always transmit in the second Tx step, and access terminals always transmit in the first Tx step. For a downlink slot, access router sends receiver IDs of access terminals scheduled in a portion of Tx2. For an uplink slot, access router sends the bandwidth assignment of access terminals scheduled in an orthogonal portion of Tx2. Note that the same portion of Tx2 may be used but this requires the access terminal to be able to somehow distinguish between an uplink and downlink slot by other means. An access terminal decodes both portions to determine if it has been scheduled and whether it is on the uplink or downlink.

For the case in which the slot gets used as a downlink, up to 32 nodes first send a REQ for uplink data during Tx. Up to four downlink nodes may be scheduled during Tx2 being notified to receive downlink data in the slot and essentially rejecting the request for uplink transmissions in Tx1.

For the case in which the slot gets used as an uplink, up to 32 nodes send a REQ during Tx. An RUM is sent during Rx1, if needed. Up to four downlink nodes may be scheduled during Tx2. During Rx2, access router cannot hear Tx2, so the decision to send a RUM on Rx2 is blind.

In one embodiment of the present disclosure, a method of scheduling among a plurality of nodes may include performing an alternating sequence of steps, i.e. a first sequence of steps followed by a second sequence of steps. Each sequence including a Tx step followed by a Rx step. In other words, the first sequence of steps comprises a first Tx step followed by a first Rx step, and the second sequence of steps comprises a second Tx step followed by a second Rx step. During the Tx step, one or more of the nodes send a REQ signal containing a request to transmit. During the Rx step, another one or more of the nodes receive the request signal and respond by sending a confirmation signal indicating an accept or a decline of the REQ signal. The REQ signal includes a unicast portion and a broadcast portion.

In one embodiment, the alternating sequence of steps may be performed during a PPA stage of the slot.

In one embodiment, the access router is configured to always transmit during the second Tx step, while the access terminals are configured to always transmit during the first Tx step.

In an uplink mode of the slot, the nodes that respond during the Rx step may use the unicast portion of the REQ signal to send supplemental information, in addition to the indication of the acceptance or the declination of the REQ signal. The supplemental information may include, but is not limited to: information regarding bandwidth assignment made by the access router for the nodes that are scheduled to transmit data.

In a downlink mode of the slot, the access router may send supplemental information regarding bandwidth assignment, during a portion of the second Tx step. The supplemental information regarding bandwidth assignment is sent by the access router during the second Tx step only to those access terminals that have accepted during the first Rx step and have not yielded after the first Rx step.

In one embodiment, the unicast portion of the REQ may include a buffer size for access terminals, and user scheduling information for the base station.

In one embodiment, the broadcast portion of the REQ signal may include an interference notification, and a sender identifier that identifies each node that sent the REQ signal. The broadcast portion of the request-to-transmit signal may further include a QoS weight that is used by the nodes that respond during the Rx step to decide whether to accept or decline the REQ signal.

A system is disclosed for scheduling among a plurality of nodes for a slot, where the plurality of nodes being connected through a wireless network and including an access router and one or more access terminals. The system may include a processing system configured to perform a first sequence of steps followed by a second sequence of steps, each sequence including a Tx step followed by a Rx step. The processing system is configured to send, during the Tx step, a REQ signal that includes a unicast portion and a broadcast portion, and that contains a request to transmit from one or more of the nodes to the remaining nodes. The processing system is configured to send from the remaining nodes, during the Rx step, a confirmation signal indicating an accept or a decline of the REQ signal.

During an uplink mode of the slot, the processing system is configured to use the unicast portion of the REQ signal to send, from the nodes that respond during the Rx step, supplemental information, in addition to the indication of the accept or the decline of the REQ signal. The supplemental information may include information regarding bandwidth assignment made by the access router for the nodes that are scheduled to transmit data.

The processing system may be configured to send from the access router the information regarding bandwidth assignment during the second Tx step only to those access terminals that have accepted during the first Rx step and have not yielded during the first Rx step.

The processing system may be configured to always transmit from the access router during the second Tx step, and to always transmit from the access terminals during the first Tx step.

A computer-readable medium may have stored therein computer-readable instructions for a processor. These instructions, when executed by the processor, may cause the processor to perform a first sequence of steps followed by a second sequence of step, during a PPA stage of the slot. Each sequence includes a Tx step during which a REQ signal containing a request to transmit is sent, followed by a Rx step during which a confirmation signal is sent indicating an accept or a decline of the REQ signal, the REQ signal including a unicast portion and a broadcast portion.

The instructions may further cause the processor to send supplemental information during the unicast portion of the REQ signal, in addition to the indication of the accept or the decline of the REQ signal. The supplemental information may include information regarding bandwidth assignment for nodes that are scheduled to transmit data during the slot.

It should be noted that various changes and modifications to the presently preferred embodiments described herein will be apparent to those skilled in the art. Such changes and modifications may be made without departing from the spirit and scope of the present disclosure and without diminishing its attendant advantages.

The components, steps, features, objects, benefits and advantages that have been discussed are merely illustrative. None of them, nor the discussions relating to them, are intended to limit the scope of protection in any way. Numerous other embodiments are also contemplated, including embodiments that have fewer, additional, and/or different components, steps, features, objects, benefits and advantages. The components and steps may also be arranged and ordered differently.

The phrase "means for" when used in a claim embraces the corresponding structures and materials that have been described and their equivalents. Similarly, the phrase "step for" when used in a claim embraces the corresponding acts that have been described and their equivalents. The absence of these phrases means that the claim is not limited to any of the corresponding structures, materials, or acts or to their equivalents.

Nothing that has been stated or illustrated is intended to cause a dedication of any component, step, feature, object, benefit, advantage, or equivalent to the public, regardless of whether it is recited in the claims.

In short, the scope of protection is limited solely by the claims that now follow. That scope is intended to be as broad as is reasonably consistent with the language that is used in the claims and to encompass all structural and functional equivalents. One or more of the methods and systems described above may be implemented using a processing system. The methods in the present disclosure are not described with reference to any particular programming language. It will be appreciated that a variety of programming languages may be used to implement the teachings of the present disclosure.

The processing system may be selectively configured and/or activated by a computer program stored in the computer. Such a computer program may be stored in any computer readable storage medium, including but not limited to, any type of disk including floppy disks, optical disks, CD-ROMs (compact disc read-only memories), and magnetic-optical disks, ROMs (read-only memories), RAMs (random access memories), EPROMs (erasable programmable read-only memory), EEPROMs (electrically erasable programmable read-only memory), magnetic or optical cards, or any type of media suitable for storing electronic instructions. The methods and systems presented herein are not inherently related to any particular computer, processor or other apparatus. Various general purpose systems may be used with different computer programs in accordance with the teachings herein. Any of the methods and systems described in the present disclosure may be implemented in hard-wired circuitry, by programming a general purpose processor, a graphics processor, or by any combination of hardware and software.

What is claimed is:

1. A method of signaling in a wireless network having a plurality of nodes, the nodes including an access router and one or more access terminals, the method comprising:
    designating a data slot capable of being a downlink slot and capable of being an uplink slot as the downlink slot or the uplink slot; and
    sending a signal in a pre-preamble stage of a data slot preceding the data slot from the access router to the access terminals to indicate the designation of the data slot as the downlink slot or the uplink slot;
    wherein the data slot designated as the downlink slot is adapted for data transmission by the access router to the access terminals, and the data slot designated as the uplink slot is adapted for reception of data at the access router from the access terminals.

2. The method of claim 1, further comprising:
    sending a request-to-transmit (REQ) message from the access router to the access terminals if the data slot is designated as the downlink slot, and receiving at the access router one or more REQ messages from the one or more access terminals if the data slot is designated as the uplink slot.

3. The method of claim 1, wherein designating the data slot as the downlink slot or the uplink slot comprises:
    the access router determining whether the data slot should be designated as the downlink slot or the uplink slot by assessing at least one of:
    information regarding a quality of service (QoS) requirement contained in a request-to-transmit (REQ) message received from one or more of the access terminals; or
    information regarding a buffer level received from one or more of the access terminals.

4. The method of claim 1, wherein designating the data slot as the downlink slot or the uplink slot further comprises:
    the access router determining whether the data slot should be designated as the downlink slot or the uplink slot by assessing at least one of:
    radio frequency (RF) conditions in the wireless network;
    a recent data transmission rate in the wireless network; or
    a recent proportion of uplink to downlink slots.

5. The method of claim 1, further comprising determining when and where to send the signal by assessing whether the access router received data or transmitted data during the data slot preceding the data slot that has been designated as the downlink slot or the uplink slot.

6. The method of claim 1, further comprising the access router determining whether the data slot should be designated as the downlink slot or the uplink slot based on the presence or absence of request-to-transmit (REQ) messages for that data slot from at least one access terminal.

7. The method of claim 1, further comprising using radio frequency (RF) conditions to determine if the access router can receive data from one or more access terminals with a predetermined level of reliability.

8. The method of claim 1, further comprising the access router determining the slot designation to be downlink based on a determination that the access router cannot receive data from one or more access terminals at a predetermined level of reliability due to high interference.

9. The method of claim 1,
    wherein the signal from the access router to the access terminals is sent during a data slot that precedes the data slot designated as the downlink slot or the uplink slot.

10. The method of claim 1,
    wherein the signal from the access router to the access terminals is an explicit slot designation signal.

11. The method of claim 9,
    further comprising the access router conveying the slot designation implicitly by sending a request-to-transmit (REQ) signal instead of a response to a request from at least one access terminal.

12. The method of claim 1, wherein the wireless network is an unplanned user deployable network.

13. The method of claim 1, wherein the wireless network is a peer-to-peer network.

14. The method of claim 1, wherein the access router is an access router that functions in an infrastructure mode.

15. A method of managing contention in a wireless network having an access router and one or more access terminals, the method comprising:
    the access router determining, for a following data slot, the direction of data transmission between the access router and the access terminals, by designating the data slot capable of being a downlink slot and capable of being an uplink slot as the downlink slot or the uplink slot; and
    the access router sending a signal in a pre-preamble stage of a data slot preceding the following data slot to the access terminals to indicate whether the following data slot has been designated as the downlink slot or the uplink slot,
    wherein the data slot designated as the downlink slot is adapted for data transmission by the access router to the access terminals, and the data slot designated as the uplink slot is adapted for reception of data at the access router from the access terminals.

16. A system for managing contention in a wireless network that includes an access router and a plurality of access terminals connectable to the base station, the system comprising:

a processing system configured to:
designate a data slot capable of being a downlink slot and capable of being an uplink slot as one of: the downlink slot adapted for data transmission by the access router to the access terminals, or the uplink slot adapted for reception of data at the access router from the access terminals; and
send a signal in a pre-preamble stage of a data slot preceding the data slot from the access router to the access terminals to indicate the designation of the data slot as the downlink slot or the uplink slot.

17. The system of claim 16, wherein the processing system is further configured to:
send a request-to-transmit (REQ) message from the access router to the access terminals if the data slot is designated as the downlink slot, and receive at the access router one or more REQ messages from one or more access terminals if the data slot is designated as the uplink slot.

18. The system of claim 16, wherein the processing system is further configured to:
assess information contained in a request-to-transmit (REQ) message received from one or more of the access terminals to determine whether the data slot should be designated as the downlink slot or the uplink slot;
wherein the information contained in the REQ message pertains to at least one of:
buffer level; or
QoS requirement.

19. The system of claim 16, wherein the processing system is further configured to:
determine whether the data slot should be designated as the downlink slot or the uplink slot by assessing information relating to one of:
radio frequency (RF) conditions in the wireless network; or
recent data transmission rate in the wireless network.

20. An access router connectable to a plurality of access terminals through a wireless network, the access router comprising:
a processing system configured to:
designate a data slot capable of being a downlink slot and capable of being an uplink slot as one of: the downlink slot adapted for data transmission by the access router to the access terminals, or the uplink slot adapted for reception of data at the access router from the access terminals;
send a signal in a pre-preamble stage of a data slot preceding the data slot from the access router to the access terminals to indicate the designation of the data slot as the downlink slot or the uplink slot; and
send a request-to-transmit (REQ) message to the access terminals if the data slot is designated as the downlink slot, and receive one or more REQ messages from the access terminals if the data slot is designated as the uplink slot.

21. An apparatus for managing contention in a wireless network having an access router and a plurality of access terminals connectable to the base station, the apparatus comprising:
means for designating a data slot capable of being a downlink slot and capable of being an uplink slot as the downlink slot or the uplink slot; and
means for sending a signal in a pre-preamble stage of a data slot preceding the data slot from the access router to the access terminals to indicate the designation of the data slot as the downlink slot or the uplink slot;
wherein the data slot designated as the downlink slot is adapted for data transmission by the access router to the access terminals, and the data slot designated as the uplink slot is adapted for reception of data at the access router from the access terminals.

22. The apparatus of claim 21, further comprising:
means for sending a request-to-transmit (REQ) message from the access router to the access terminals if the data slot is designated as the downlink slot; and
means for receiving at the access router one or more REQ messages from one or more access terminals if the data slot is designated as the uplink slot.

23. A non-transitory computer-readable medium having stored therein computer-readable instructions executable by a processor that cause said processor to:
designate a data slot capable of being a downlink slot and capable of being an uplink slot as the downlink slot or the uplink slot; and
send a signal in a pre-preamble stage of a data slot preceding the data slot from an access router to one or more access terminals connected to the access router in a wireless network, to indicate the designation of the data slot as the downlink slot or the uplink slot;
wherein the data slot designated as the downlink slot is adapted for data transmission by the access router to the access terminals, and the data slot designated as the uplink slot is adapted for reception of data at the access router from the access terminals.

24. The computer-readable medium of claim 23, wherein the instructions further cause the processor to:
send a request-to-transmit (REQ) message from the access router to the access terminals if the data slot is designated as the downlink slot, and receive at the access router one or more REQ messages from the one or more access terminals if the data slot is designated as the uplink slot.

25. The method of claim 1,
wherein the data slot comprises:
a pre-preamble stage for scheduling transmission of data by the nodes;
a preamble stage for predicting the rate of data transmission between the access router and the access terminals;
a data portion for communicating data between the access router and the access terminals; and
an acknowledgment stage for acknowledging data transmission or reception.

26. The method of claim 25, wherein the pre-preamble stage of the data slot includes an alternating sequence of a transmit step and a receive step;
wherein the transmit step in the pre-preamble stage is usable by the access terminals to send a request-to-transmit (REQ) message, and is usable by the access router to send a control signal selecting one or more of the access terminals to transmit data; and
wherein the receive step in the pre-preamble stage is usable by the nodes for one of: confirming a REQ message, or blocking an interfering node from transmitting during the data portion of the data slot.

27. The method of claim 26,
wherein the signal from the access router to the access terminals is sent on a separate control channel.

28. The method of claim 27, wherein the separate control channel is one of the transmit steps in the pre-preamble stage of the data slot preceding the data slot designated as the downlink slot or the uplink slot.

29. A communication system, comprising:
an access router;
a plurality of access terminals connectable to the access router through a wireless network; and
a processing system configured to:
- designate a data slot capable of being a downlink slot and capable of being an uplink slot as one of: the downlink slot adapted for data transmission by the access router to the access terminals, or the uplink slot adapted for reception of data at the access router from the access terminals;
- send a signal in a pre-preamble stage of a data slot preceding the data slot from the access router to the access terminals to indicate the designation of the data slot as the downlink slot or the uplink slot; and
- send a request-to-transmit (REQ) message from the access router to the access terminals if the data slot is designated as the downlink slot, and receive at the access router one or more REQs from the access terminals if the data slot is designated as the uplink slot.

* * * * *